3,138,521
FUNGICIDAL METHOD

Charles F. Jelinek, Easton, Pa., and Lester N. Stanley, Delmar, and William H. Armento, Albany, N.Y., assignors to General Aniline & Film Corporation, New York, N.Y., a corporation of Delaware
No Drawing. Filed Oct. 4, 1960, Ser. No. 60,286
10 Claims. (Cl. 167—30)

This invention relates to fungicidal and herbicidal compositions and to a method for using such compositions to combat fungal diseases of plants and to control weeds and undesirable foliage. More particularly, the invention relates to compositions containing, as their active ingredients, certain diazoamino compounds and to a method for combatting fungal infections attacking parts of growing plants.

Phytopathogenic fungi are responsible for considerable annual losses to agriculture, either by reducing the number of plants or by destroying the plants altogether after germination of the seeds. Fairly good results have been obtained by coating the seeds, before planting, with certain disinfectant organic mercury compounds and then planting the coated seeds. However, this method has a number of disadvantages which have greatly restricted the value thereof. One such disadvantage resides in the fact that the metal-containing disinfectants are sometimes phytotoxic themselves when used in relatively high concentrations. Another disadvantage stems from the fact that, while the disinfectant may destroy fungi on the surface of the seed, it is effective as a soil disinfectant only within a radius of about 1 to 2 mm. around the seed. Thus, as the seedling grows beyond this narrowly restricted sphere, its growing parts once more become subject to attack by soil-borne phytopathogenic fungi. To overcome this disadvantage, it would be necessary to treat the soil itself with the anti-fungal agents. This procedure is not only not economically feasible, but also concentrations sufficient to be effective would make the growing medium itself, i.e. the soil, phytotoxic.

In accordance with the present invention, it has been found that certain diazoamino compounds may be used in dilute solutions, in a solvent which is non-injurious to plants, to effectively treat infected plant parts. They are particularly useful in treating late blight disease in tomato plants caused by the organism *Phytophthora infestans*.

The diazoamino compounds which are effective belong to the class having the general formula:

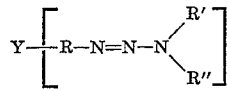

wherein Y is hydrogen, the radical

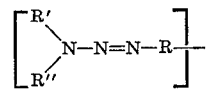

or the radical

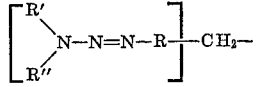

R is the aromatic moiety of a diazotizable aromatic amine preferably free from solubilizing groups; R' is a lower alkyl or lower hydroxyalkyl radical; R" is alkyl or aryl, either one of which can be substituted by —SO₃H, —COOH, or —OH; and wherein R' and R" may be joined with the nitrogen to form a N-heterocyclic radical. Where —SO₃H or —COOH groups are present, the corresponding alkali metal salts can also be used.

Particularly effective are aromatic diazoamino compounds within this class in which (1) R contains the —CONH— group and R' and R" are each free of —SO₃H or —COOH groups (e.g., dimethylamino, diethylamino, diethanolamino, morpholino and piperidino); or (2) in which R is a halogenated aromatic group and R' and R" are the same as in (1) above.

However, as will appear from the examples below, the presence of either —SO₃H or —COOH groups in either R' or R" is by no means excluded from the class of active compounds.

Although it is preferable that the aromatic radical R does not contain solubilizing groups, certain of the latter are not detrimental. Thus, it is possible for the radical R to have been derived from such diazotizable aromatic amines as anthranilic acid, m- and p-amino-benzoic acids, 3-amino-p-toluic acid, 3-amino-p-anisic acid, sulfanilic acid, m-toluidine-4-sulfonic acid and 4-sulfo-o-anisidine.

In the following examples, the fungicidal activities of representative members of the class of compounds disclosed above were tested against the tomato late blight fungus, *Phytophthora infestans*. While certain fungicidal concentrations of some compounds falling within the class may exhibit some phytotoxicity, it will be readily apparent that the particular substances can also be used as fungicides for non-plant purposes where phytoxic properties will be of no consequence. For such purposes, the fungicides can be diluted with any suitable inert carrier.

(A) PREPARATION OF TEST ORGANISM

Late blight fungus, *Phytophthora infestans*, was grown on sterile wheat seeds in flasks kept at room temperature. Ten days prior to testing, the organisms were transferred to a nutrient medium and further grown. Before application to the test plants, a slurry was made of the mycelia and the slurry was then homogenized by means of a Waring Blendor.

(B) PREPARATION OF TEST CHEMICAL

The test chemicals were dissolved in a mixture of water and acetone containing a wetting agent to provides a series of solutions of each chemical having concentrations of 1,000 p.p.m. For purposes of comparison, solutions of similar concentrations were also prepared of two commercial fungicides, Captan (N-trichloro-methylmercapto-4-cyclohexene-1,2-carboximide) and Manzate (manganese ethylenebisdithiocarbamate).

(C) TEST PROCEDURE

Duplicate tomato plants of the Bonny Best variety, 4 to 5 inches high, were placed on a rotating turntable and sprayed with the solutions of the test chemicals. One hundred to 110 milliliters of solution was applied to the pair of plants using a pressure spray gun with air pressure set at 40 pounds per square inch. Application of the spray took 30 seconds and the foliage was wetted to run-off.

Six plants were sprayed with the aqueous acetone solvent itself and were held as checks. An additional six plants each were sprayed with Captan and Manzate and held for comparison standards.

As soon as the spray was dry on the foliage, the plants were inoculated by again placing them on the turntable and spraying them with the homogenized mycelial suspension for 30 seconds.

Following inoculation, all of the plants, including the check plants, were incubated for 48 hours at 72° F. and at 100% relative humidity. The plants were then removed from the incubator and placed in a shade house in a greenhouse for an additional 48 hours. At the expiration of the second 48 hour period the plants were examined for lesions.

The total number of lesions per eleven 15× magnification fields on eleven leaflets of the three top leaves of each plant were counted, and the average number of lesions per plant calculated. Control of infection was rated according to the following scale:

A—0–5 lesions per plant.
B—6–14 lesions per plant.
C—15–25 lesions per plant.
D—More than 25 lesions per plant.

*Examples*

In the following table the results are given from tests performed with representative members of the class according to the procedure described above, in concentrations of 1,000 p.p.m.

| Compound | Formula | Rating |
|---|---|---|
| 1 | ⌬—CONH—⌬(OC$_2$H$_5$)(OC$_2$H$_5$)—N=N—N(CH$_3$)—C$_2$H$_4$SO$_3$Na | A |
| 2 | H$_2$NCO—⌬(OCH$_3$)—N=N—N(CH$_3$)—C$_2$H$_4$SO$_3$Na | D |
| 3 | ⌬—CONH—⌬(OC$_2$H$_5$)(OC$_2$H$_5$)—N=N—N(C$_2$H$_4$)(C$_2$H$_4$)O | D |
| 4 | (⌬(OCH$_3$)—N=N—N(CH$_3$)—C$_2$H$_4$SO$_3$Na)$_2$ | D |
| 5 | NO$_2$—⌬(CH$_3$)(OCH$_3$)—N=N—N(CH$_2$COONa)—⌬—SO$_3$Na | C |
| 6 | ⌬(CH$_3$)(Cl)—N=N—N(CH$_3$)—CH$_2$COONa | D |
| 7 | (CH$_3$—⌬(CH$_3$)—N=N—N(CH$_3$)—C$_2$H$_4$SO$_3$Na)$_2$ | D |
| 8 | ⌬—CONH—⌬(OCH$_3$)—N=N—N(CH$_3$)—CH$_2$CH$_2$SO$_3$Na | D |
| 9 | C$_4$H$_9$CONH—⌬—N=N—N(CH$_3$)—CH$_2$CH$_2$SO$_3$Na | A |
| 10 | ⌬(CH$_3$)—N=N—⌬(CH$_3$)—N=N—N(CH$_3$)—CH$_2$COONa | D |
| 11 | ⌬(Cl)—N=N—N(CH$_3$)—CH$_2$CH$_2$SO$_3$Na | C |

| Compound | Formula | Rating |
|---|---|---|
| 12 | 2-Cl-C₆H₄-N=N-N(CH₃)₂ | B |
| 13 | 2-Cl-C₆H₄-N=N-N-(C₂H₄OH)₂ | A |
| 14 | 2-Cl-C₆H₄-N=N-N(C₂H₄)₂O (morpholino) | B |
| 15 | 2-Cl-C₆H₄-N=N-N(CH₃)-CH₂COONa | C |
| 16 | 2-Cl-C₆H₄-N=N-N(CH₃)₂ | C |
| 17 | 2-Cl-C₆H₄-N=N-N(C₂H₄OH)₂ | C |
| 18 | 2-Cl-C₆H₄-N=N-N(C₂H₄)₂O | D |
| 19 | 2-Cl-C₆H₄-N=N-N(CH₃)-CH₂CH₂SO₃Na | B |
| 20 | 4-Cl-C₆H₄-N=N-N(CH₃)-CH₂CH₂SO₃Na | A |
| 21 | 4-Cl-C₆H₄-N=N-N(CH₃)-CH₂COONa | B |
| 22 | 4-Cl-C₆H₄-N=N-N(CH₃)₂ | B |
| 23 | 4-Cl-C₆H₄-N=N-N-(C₂H₄OH)₂ | B |
| 24 | 4-Cl-C₆H₄-N=N-N(C₂H₄)₂O | B |
| 25 | H₉C₄NHCO-C₆H₄-N=N-N(CH₃)-CH₂CH₂SO₃Na | C |
| 26 | 2-CH₃,4-Cl-C₆H₃-N=N-N(C₆H₁₁)-CH₂CH₂SO₃Na | A |
| 27 | 2-OCH₃,4-Cl-C₆H₃-N=N-N(CH₃)₂ | A |
| 28 | 2-OCH₃,5-CH₃-C₆H₃-N=N-N(CH₃)₂ | C |

| Compound | Formula | Rating |
|---|---|---|
| 29 | ![structure] 2-OCH₃, 4-CH₃ phenyl—N=N—N(C₂H₅)₂ | C |
| 30 | (HOC₂H₄)₂N—⟨phenyl⟩—N=N—⟨phenyl⟩—N=N—N(CH₃)₂ | B |
| 31 | 2-OCH₃, 4-NO₂ phenyl—N=N—NHCN | A |
| 32 | [⟨phenyl⟩(OCH₃)—N=N—NHCN]₂ | C |
| 33 | 2,4-Cl₂ phenyl—N=N—NHCN | B |
| 34 | 2-OCH₃, 4-CON(C₂H₅)₂ phenyl—N=N—NHCN | D |
| 35 | Captan | A |
| 36 | Manzate | A |

While compounds of this invention have been described in connection with their use as fungicides, these compounds are also useful for controlling weed growth and for destroying undesirable foliage.

It is to be understood that the foregoing detailed description is given merely by way of illustration and that many variations may be made therein without departing from the spirit of this invention.

What is claimed is:

1. A method for combatting fungus diseases in plants which comprises contacting plant fungi with a compound selected from the group consisting of diazoamines of the formula $$Y\left[R-N=N-N\diagdown_{R''}^{R'}\right]$$

wherein Y is a member of the group consisting of hydrogen, the radical $$\left[\begin{array}{c}R'\\R''\end{array}\diagup N-N=N-R\right]-CH_2-$$

and $$\left[\begin{array}{c}R'\\R''\end{array}\diagup N-N=N-R\right]-$$

R is the aromatic moiety of a diazotizable aromatic amine consisting of a benzene nucleus containing substituents selected from the group consisting of hydrogen, halo, nitro, lower alkyl, lower alkoxy, lower alkyl carbamyl, lower alkanamido, lower hydroxyalkyl amino, benzamido, carboxy, and sulfo, R' is a member of the group consisting of lower alkyl and lower hydroxyalkyl, R'' is a member of the group consisting of alkyl, phenyl, HSO₃-substituted alkyl, HOOC-substituted alkyl, HO-substituted alkyl, HSO₃-substituted phenyl, HOOC-substituted phenyl, and HO-substituted phenyl, and wherein R' and R'' may be joined with the N atom to which they are attached to form a heterocyclic radical selected from the group consisting of morpholinyl and piperidyl and the alkali metal salts of such HSO₃- and HOOC-substituted compounds, said compound being applied to said plants in quantities sufficient to combat fungus diseases therein.

2. The method according to claim 1 wherein the compound has the formula

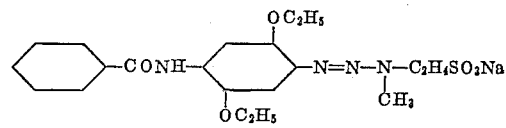

3. The method according to claim 1 wherein the compound has the formula

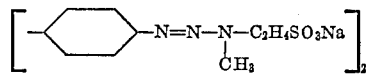

4. The method according to claim 1 wherein the compound has the formula

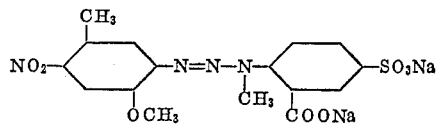

5. The method according to claim 1 wherein the compound has the formula

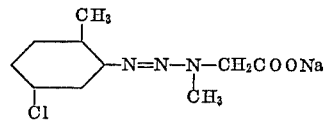

6. The method according to claim 1 wherein the compound has the formula

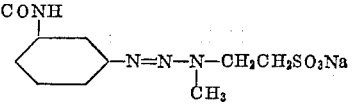

7. The method according to claim 1 wherein the compound has the formula

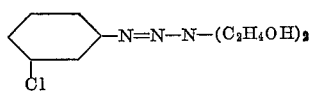

8. The method according to claim 1 wherein the compound has the formula

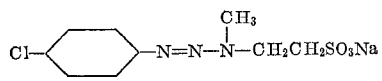

9. The method according to claim 1 wherein the compound has the formula

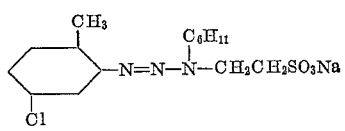

10. The method according to claim 1 wherein the compound has the formula

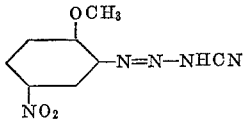

References Cited in the file of this patent

UNITED STATES PATENTS

| | | |
|---|---|---|
| 1,858,623 | Hentrich et al. | May 17, 1932 |
| 1,874,524 | Hentrich et al. | Aug. 30, 1932 |
| 1,879,424 | Neelmeier et al. | Sept. 27, 1932 |
| 1,882,562 | Glietenberg et al. | Oct. 11, 1932 |
| 1,968,878 | Dahlen et al. | Aug. 7, 1934 |
| 2,078,387 | Kern | Apr. 27, 1937 |
| 2,712,005 | Leavitt | June 28, 1955 |
| 2,781,337 | Moser | Feb. 12, 1957 |

FOREIGN PATENTS

| | | |
|---|---|---|
| 873,173 | Germany | Apr. 13, 1953 |
| 876,019 | Germany | May 7, 1953 |